US011810047B2

(12) United States Patent
Kovalova et al.

(10) Patent No.: US 11,810,047 B2
(45) Date of Patent: Nov. 7, 2023

(54) CERTIFIED DELIVERIES OF HIGH-VALUE ITEMS

(71) Applicant: Maplebear, Inc., San Francisco, CA (US)

(72) Inventors: Anastasija Kovalova, West Bloomfield, MI (US); Neera Chatterjee, New York, NY (US)

(73) Assignee: Maplebear, Inc., San Francisco, CA (US)

( * ) Notice: Subject to any disclaimer, the term of this patent is extended or adjusted under 35 U.S.C. 154(b) by 0 days.

(21) Appl. No.: 17/178,183

(22) Filed: Feb. 17, 2021

(65) Prior Publication Data
US 2022/0261744 A1    Aug. 18, 2022

(51) Int. Cl.
*G06Q 10/0832* (2023.01)
*G06F 21/31* (2013.01)
*G06Q 10/0837* (2023.01)

(52) U.S. Cl.
CPC ......... *G06Q 10/0832* (2013.01); *G06F 21/31* (2013.01); *G06Q 10/0837* (2013.01)

(58) Field of Classification Search
CPC .............. G06F 3/0488; G06F 3/04883
See application file for complete search history.

(56) References Cited

U.S. PATENT DOCUMENTS

| | | | | |
|---|---|---|---|---|
| 2006/0138223 A1* | 6/2006 | Schar | ................. | G07C 9/37 235/384 |
| 2015/0081587 A1* | 3/2015 | Gillen | ............. | G06Q 10/08355 705/338 |
| 2016/0316322 A1* | 10/2016 | Gillen | .................. | H04W 4/029 |
| 2018/0121875 A1* | 5/2018 | Satyanarayana Rao | ...................... | G06Q 10/08355 |
| 2022/0180308 A1* | 6/2022 | Sheth | .................... | G06F 3/0482 |

FOREIGN PATENT DOCUMENTS

WO    WO-2016171617 A1 *  10/2016
WO    WO-2018202734 A1 *  11/2018

OTHER PUBLICATIONS https://www.amazon.com/gp/help/customer/display.html?nodeId=GCC7G9HKYQBZT5FX (Year: 2021).*

* cited by examiner

*Primary Examiner* — Rupangini Singh
*Assistant Examiner* — Robert Fredeking
(74) *Attorney, Agent, or Firm* — Fenwick & West LLP

(57) ABSTRACT

An online system receives, from a customer mobile application (CMA) an order including a high-value item determines that the order includes the high-value item. The online system transmits an indication that the order includes the high-value item to a delivery mobile application (DMA). The DMA transmits a real-time location of a client device of a delivery agent to the online system. Responsive to determining that the delivery agent is at a delivery location, the online system transmits an indication to the DMA to display a user interface including an interactive element for requesting a signature from a customer. Responsive to receiving an indication of an interaction with the interactive element, the online system transmits an indication to the CMA to display a user interface with a signature element. The CMA transmits a signature received via the signature element to the online system, which stores the signature as verification information.

20 Claims, 12 Drawing Sheets

User Interface 500C

Interactive Text Boxes 530

1:58

< Enter ID information (?)

Customer's Full Name

Name

State

Texas ⌄

Date of Birth

MM/DD/YYYY

Expiration Date

MM/DD/YYYY

Confirm

Confirmation Button 535

FIG. 5C

CERTIFIED DELIVERIES OF HIGH-VALUE ITEMS

BACKGROUND

This disclosure relates generally to item delivery. More particularly, the disclosure relates to technical mechanisms for verifying delivery of an order with one or more high-value items.

Order delivery systems allow customers to receive orders of items from delivery agents who bring the orders from retailers to the customers. After a customer has paid for his/her order, the customer may request a refund or another remedial action from the order delivery system if the order is missing one or more items. However, in some instances, a delivery agent may have kept an item ordered by a customer, particularly a high-value item. In another instance, a customer may falsely indicate that they did not receive an item in order to receive a refund anyway. In either scenario, the order delivery system is disadvantaged by fraudulent behavior, either on the part of the delivery agent or the customer. Therefore, a system for certifying delivery of orders, particularly those with high-value items, is necessary.

SUMMARY

To certify deliveries of orders, an online concierge system communicates with a client device of a delivery agent and a client device of a customer to determine whether an order has been delivered. The online concierge system transmits indications that an order contains a high-value item to the delivery agent's client device and sends an indication to the delivery agent's client device to present a user interface upon determining that the delivery agent is at a delivery location. After receiving an indication of an interaction via the user interface, the online concierge system transmits an indication to the customer's client device to display a user interface with a signature element configured to receive a signature from the customer. The online concierge system stores the customer's signature as a verification that the order, including high-value item, was delivered.

More particularly, in some embodiments, the online concierge system receives, from a delivery mobile application, information describing an order that includes a high-value item. The online concierge system transmits an indication of the high-value item to the delivery mobile application and receives a real-time location of a client device associated with the delivery mobile application. Responsive to determining that the delivery agent is located at a delivery location of the order based on the received location, the online concierge system transmits an indication to the delivery mobile application to display a first user interface. The first user interface may include interactive elements that allow the delivery agent to indicate that he/she has reached the delivery location. Responsive to receiving an indication of an interaction via the first user interface, the online concierge system transmits an indication to a customer mobile application to display second user interface to the customer who placed the order. The second user interface includes a signature element that the customer may interact with to sign for the order. Responsive to receiving a signature via the second user interface, the online concierge system stores the signature as a verification that the customer received items in the order, including the high-value item.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 5C is a user interface depicting interactive text boxes configured to receive identification information, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
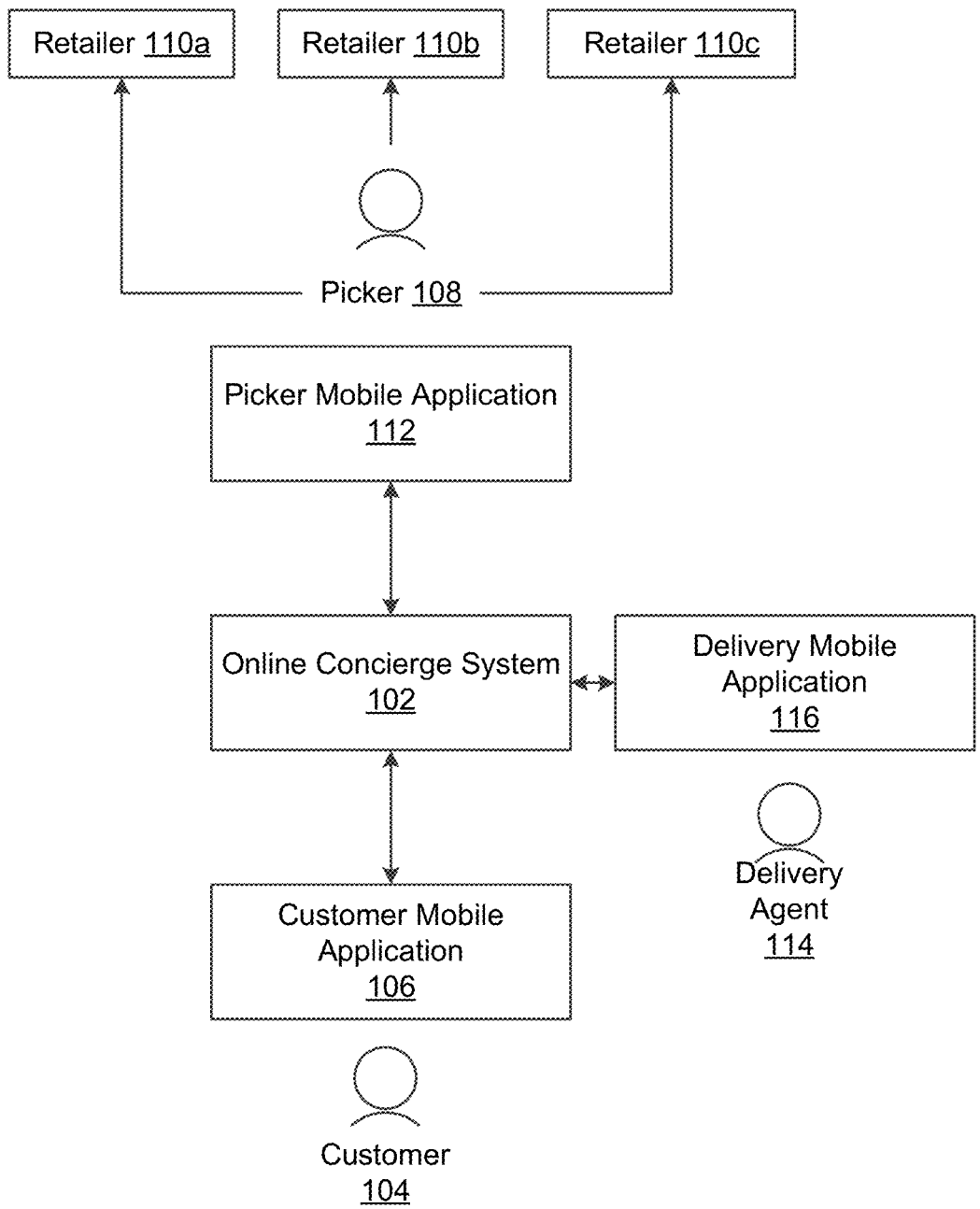
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. The retailers may also be referred to as warehouse locations. Each picker 108 fulfills an order received from the online concierge system 102 at one or more retailers 110. In one embodiment, pickers 108 make use of a picker mobile application 112 which is configured to interact with the online concierge system 102.

The environment 100 may also include one or more delivery agents 114. A delivery agent 114 may be a contractor, employee, or other person (or entity) who is enabled to pick up orders of items from retailers 110 and deliver the orders to customers 104. The delivery agents 114 may use a delivery mobile application (DMA) 116, which is configured to interact with the online concierge system 102, to aide in delivery of orders. For instance, the DMA 116 may display, to the delivery agent 114, user interfaces depicting delivery information, such as a location of a retailer 110 to pick up the order from, a location of the customer 104 to deliver the order to, instructions about the delivery, and the like. In some embodiments, some delivery agents 114 may also be pickers 108 and work to both fulfill and deliver orders, and the DMA 116 may be combined with the PMA 112 into one application that directs the delivery agent to do so. The DMA 116 is further described in relation to FIG. 3C.

Online Concierge System

Figure 2:
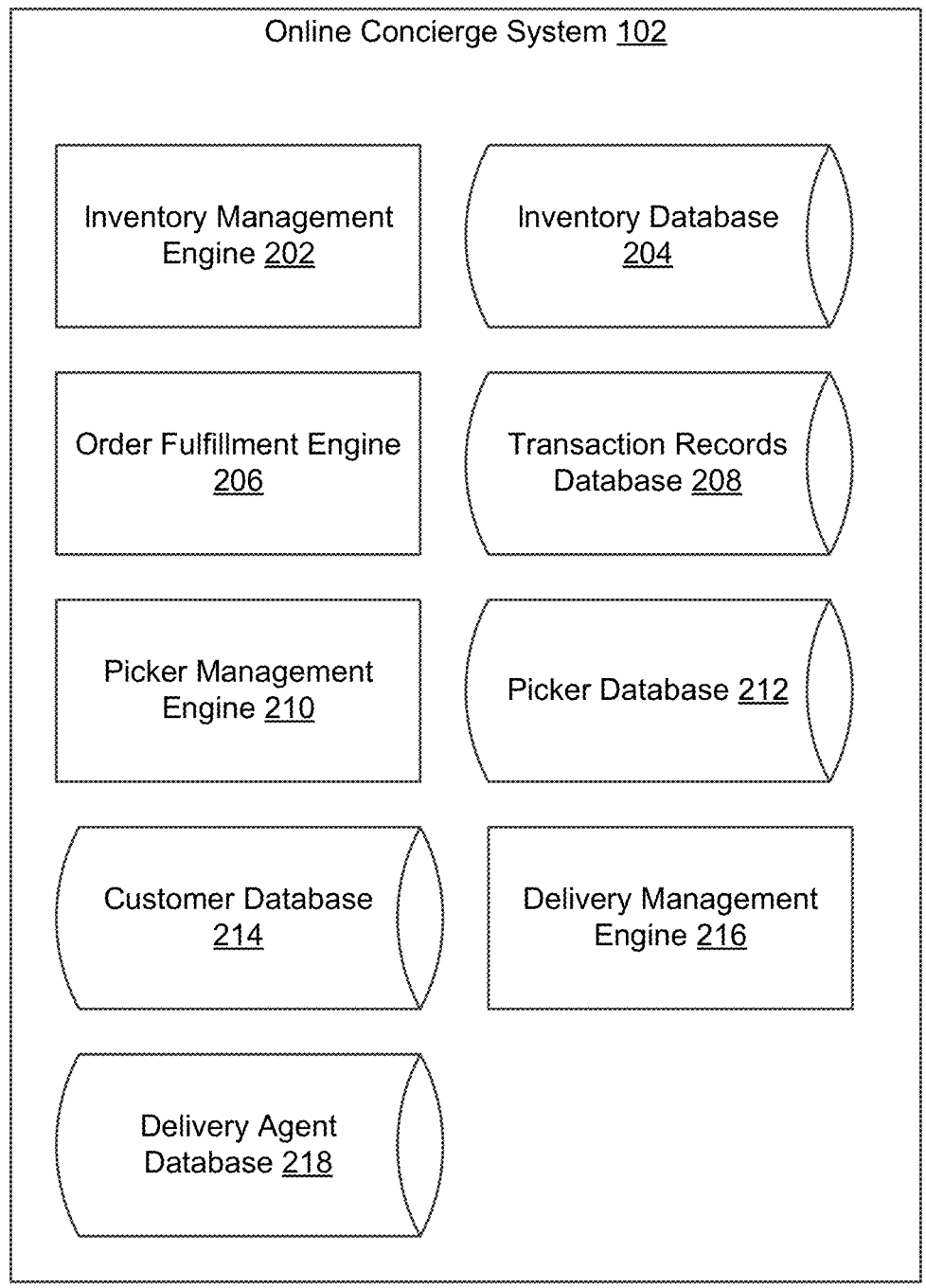
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

The online concierge system 102 may use a delivery management engine 216 to manage the delivery of orders to customers 104. The delivery management engine 216 receives information describing orders that have been fulfilled (or in progress toward being fulfilled) from the order fulfillment engine 206. For each order, the delivery management engine 216 identifies one or more appropriate delivery agents 114 to deliver the order based on one or more parameters, such as the delivery agent's proximity to the retailer 110 where the order was/is being fulfilled, his/her proximity to the delivery location of the order, the delivery locations of other orders currently assigned to him/her, a certification of the delivery agent being trusted for delivering high-value items, and so on. The delivery management engine 216 may retrieve additional parameters from a delivery agent database 218, which stores information describing each delivery agent 114, such as his/her name, gender, rating, preferred delivery region, and so on. The delivery management engine 216 transmits an identification of the order to the identified delivery agent 114 108 via the delivery mobile application 116. The delivery management engine 216 may also transmits indications to the DMA 116 to display user interfaces showing information about orders, a sequence to deliver orders in, and the like. The user interfaces are further described in the relation to FIGS. 3C and 4A-5C.

For each order assigned to a delivery agent 114, the delivery management engine 216 determines whether the order includes a high-value item. A high-value item is an item in an order that is considered costly in price. In some embodiments, high value items may include items that are valued for reasons other than monetary cost (e.g., certain pharmaceutical products or age-restricted items, like alcoholic beverages) and require additional delivery review due to their value. High-value items may have a price over a threshold value, which may be set by an administrator of the online concierge system 102. The delivery management engine 216 may determine, for each item in an order, whether the price is above the threshold value. Alternatively, the delivery management engine 216 may access the inventory database 204, which may include labels indicating whether an item is considered "high-value" by a retailer 110 or administrator, to determine whether an item in an order is a high-value item.

If the delivery management engine 216 determines that an item in an order is a high-value item, the delivery management engine 216 interacts with the CMA 106 and DMA 116 complete a verification process that confirms that the order (and the high-value item) was delivered to the customer 104. In particular, the delivery management engine 216 transmits an indication to the DMA 605 that the order includes the high-value item and monitors a location of the client device of the DMA 116 as the delivery agent 114 delivers orders to customers 104. The delivery management engine 216 determines (based on locations received from the DMA 116) when the delivery agent 114 has reached a delivery location of the order with the high-value item. For instance, the delivery management engine 216 may set a geofence around each delivery location (e.g., with a radius of 30 meter extending from the delivery location) and determine that the delivery agent 114 has reached the delivery location when the location of the client device is within the area enclosed by the geofence. Alternatively, the delivery management engine 216 may determine that the delivery agent 114 has reached the delivery location upon receiving an indication from the DMA 116.

If the delivery management engine 216 determines that the client device (and, implicitly, the delivery agent 114) has reached the delivery location, the delivery management engine 216 generates and transmits, to the DMA 116, an indication to display a user interface including an interactive element for requesting a signature from the customer 104. For instance, the interactive element may be a button accompanied by text indicating that the order requires the customer 104 to provide a signature to the online concierge system 102 due to the high-value item being included in the order. In other embodiments, the interactive element may be any other kind of interactive element suitable for receiving confirmation from the delivery agent 114 that he/she understands that the customer 104 needs to provide his/her signature to complete delivery of the order. The user interface is further described with respect to FIG. 4B.

Upon receiving an indication of an interaction with the interactive element from the DMA 116 (e.g., an indication that the delivery agent 114 pressed the button), the delivery management engine 216 generates and transmits, to the CMA 106, an indication to display a user interface including a signature element. The signature element may be an interactive box configured to receive a drawing of the customer's signature or may be a text box configured to receive a textual signature. The signature element may also be associated with a timer, and the customer 104 may be required to provide a signature via the signature element within a set amount of time before the DMA 116 would need to send a new indication. In some embodiments, the user interface may include a scanning element for scanning an identification document of the customer, a camera element for capturing an image of the customer 104, the order, and/or the delivery location, an audio element for captured a verbal confirmation of delivery from the customer 104, or a plurality of text boxes for manually entering identification information about the customer 104. Such interactive elements may be included along with the signature element or may included responsive to receiving an indication from the CMA 106 or the DMA 114 that the customer 104 is unable to sign for delivery of the order.

The delivery management engine 216 may receive an indication from the CMA 106 that the customer 104 signed for the order via the signature element and store the signature from as verification information responsive to receiving the indication. The delivery management engine 216 stores the signature in the transaction records database 208 in relation to the order, the customer 104, and/or the delivery agent 114. In some embodiments, the delivery management engine 216 may store identification information from the customer's identification document, image of the customer 104, delivery location, and/or order, and/or identification information entered via textual boxes in the user interface as verification information in the transaction records database 208. Although the image of the customer 104 may be stored, in some embodiments, the image is not stored so that the customer's privacy is protected.

The delivery management engine 216 may receive an indication from the DMA 116 if the delivery agent 114 indicates, via the user interface, that he/she is unable to receive verification information for the order (e.g., unable to receive a signature, scan of an identification document, etc.). In these cases, the delivery management engine 216 may send, via the user interface, instructions for the delivery agent 114 to return the order to the retailer 110. In some embodiments, the instructions may indicate to return the entire order to the retailer 110 or only return the high-value item and deliver the remaining items in the order. The delivery management engine 216 may receive an indication from the DMA 116 when the order has been returned to the retailer 110 and, upon receiving the indication, may send instructions to the DMA 116 on how to receive reimbursement for the order via the user interface, in embodiments where the delivery agent 114 also fulfilled the order at the retailer 110 (i.e., as a picker 108). Alternatively, the delivery management engine 216 may send instructions to the DMA on how to receive compensation for time spent returning the order in response to receiving the indication (e.g. to call an external operator, send an image of a return receipt, chat with an external operator via messaging service, etc.).

In some embodiments, the delivery management engine 216 may complete the verification process described above for orders that do not include high-value items. For example, the delivery management engine 216 may send indications to the DMA 116 and CMA 106 to display user interfaces for receiving verification information for all orders or upon receiving a request from a customer 106 for verification upon delivery (e.g., if the customer 104 is worried about the high-value item being stolen or lost). Further, the delivery management engine 216 may use the verification process when a delivery agent 114 is associated with fraudulent behavior (e.g., past instances of missing items for orders delivered by the delivery agent 114). Fraudulent behavior associated with delivery agents 114 may be stored in the delivery agent database 218 upon occurrence, such that the delivery management engine 216 may determine whether to use the verification process for a delivery agent 114 or not based a record of fraudulent behavior.

Figure 3A:
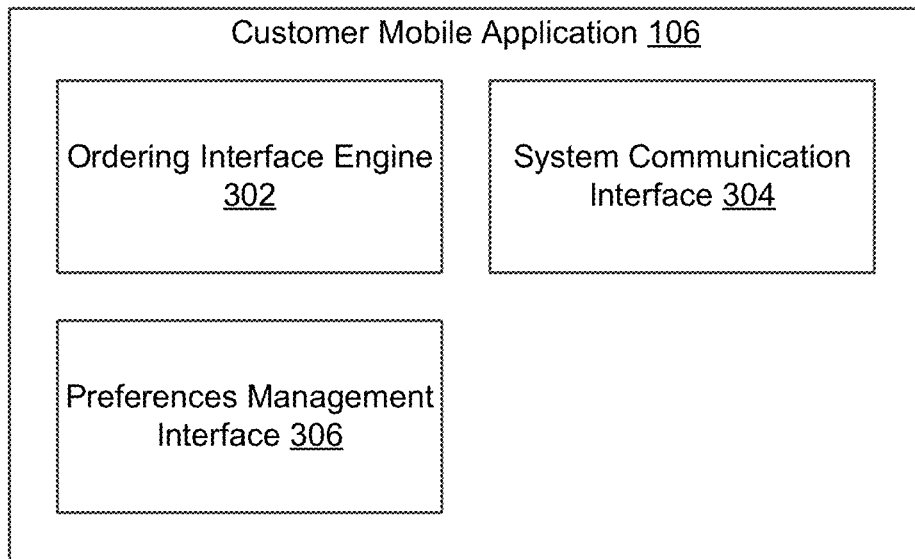
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through and select products and place an order.

Customers 104 may also use the customer ordering interface to message with pickers 108 and receive notifications regarding the status of their orders. Customers 104 may view their orders and communicate with pickers 108 regarding an issue with an item in an order using the customer ordering interface. For example, a customer 104 may respond to a message from a picker 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the picker 108. The customer 104 may edit the template message to include more information about the item or course of action and communicate back and forth with the picker 108 until the issue is resolved.

The ordering interface engine 302 may receive indications to present user interfaces from the online concierge system 102 when the delivery management engine 216 is following the verification process for an order (e.g., when the order includes a high-value item, the customer 104 requested verification of delivery, etc.). The ordering interface engine 302 may present user interfaces via the customer ordering interface and may receive interactions with interactive elements of the user interfaces via the customer ordering interface. The ordering interface engine 302 sends indications about the interactions to the delivery management engine 216 for the verification process.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
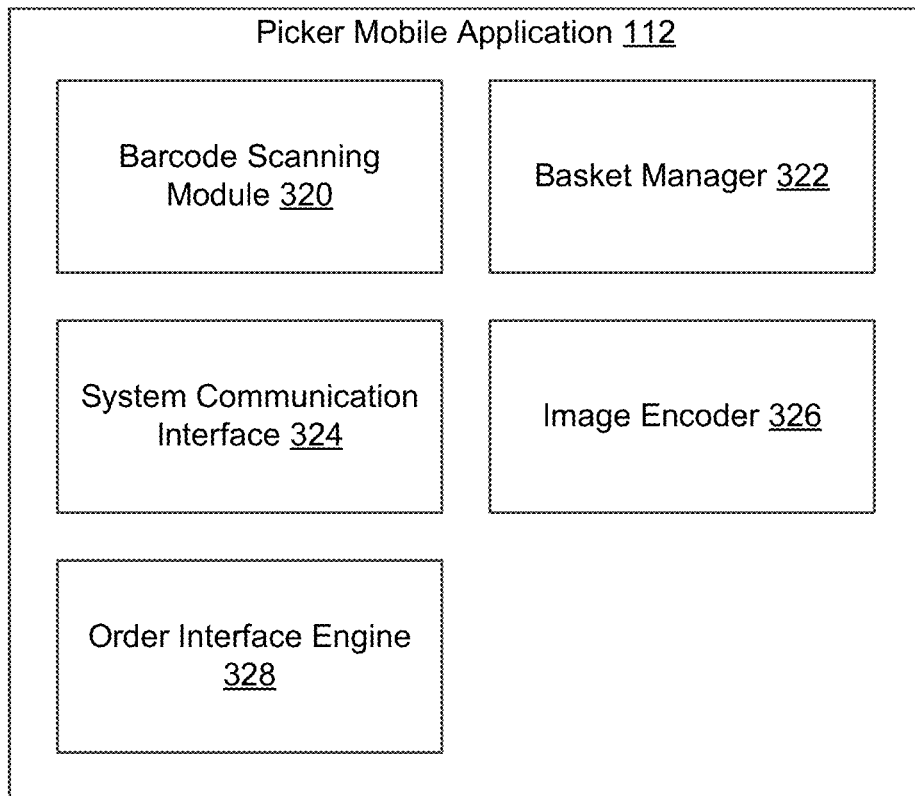
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may additionally generate a picker order interface to be transmitted via the PMA 112 to a picker to show orders submitted by customers 104 and messages from customers 104.

A picker order interface is an interactive interface through which pickers 108 may interact message with customers 104 and receive notifications regarding the status of orders they are assigned. Pickers 108 may view their orders through the picker order interface and indicate when there is an issue with an item in an order, such as the item being out of stock or of poor quality. A picker 108 may draft a message to a customer 104 associated with the order requesting clarification about what to do for the item given the issue. The picker order interface displays template messages for the picker 108 to choose from regarding the item and the picker 108 may edit the template message to include more information about the item or a question for the customer 104. The picker 108 communicate back and forth with the customer 104 until the issue is resolved.

In some embodiments, the PMA 112 also includes a preferences management interface 306 which allows the picker 108 to manage basic information associated with his/her account, such as his/her name, preferred shopping zone, status, and other personal information. The preferences management interface 306 may also allow the picker 108 to review previous orders and/or his/her shopping level.

Figure 3C:
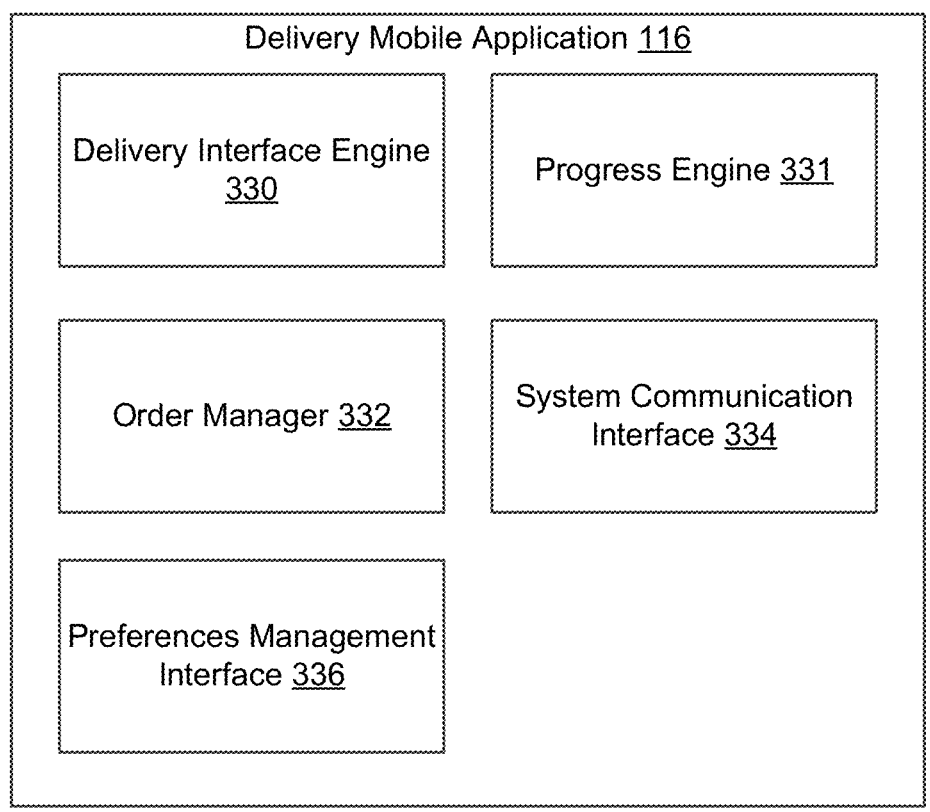
FIG. 3C is a block diagram of the delivery mobile application (DMA), according to one embodiment.

FIG. 3C is a block diagram of the delivery mobile application (DMA) 116, according to one embodiment. The delivery agent 114 accesses the DMA 116 via a client device, such as a mobile phone, tablet, laptop, or desktop computer. The DMA 116 may be accessed through an app running on the client device or through a website accessed in a browser. The DMA 116 includes a delivery interface engine 330, which provides an interactive user interfaces with which the delivery agent 114 can review delivery information for orders. The user interfaces may depict one or more notifications about the orders, such as when more orders have been assigned to the delivery agent 114, an order includes a particular item, the delivery agent must complete an additional action for an order, and the like. The user interfaces may also depict a map to one or more delivery locations, an address of each delivery location, delivery instructions, notifications about an order, and one or more interactive elements that allow a delivery agent 114 to navigate to a delivery location, view items in an order, call a customer 104 about an order, message a customer about an order, or the like. The user interface is further described with respect to FIGS. 4A-4D.

The delivery interface engine 330 may receive user interfaces and indications from the online concierge system 102 when the delivery management engine 216 is following the verification process for an order (e.g., when the order assigned to a delivery agent 114 includes a high-value item, the customer 104 requested verification of delivery, etc.). The delivery interface engine 330 may present user interfaces upon receiving indications from the delivery management engine 216 and may receive interactions with interactive elements via the user interfaces. The delivery interface engine 330 sends indications about the interactions to the delivery management engine 216 for the verification process.

The DMA also includes a progress engine 331 and an order manager 332. The progress engine 331 tracks progress of the delivery agent 114 on a current delivery (i.e., a delivery of an order the delivery agent 114 is currently making). The progress may include a how far from the delivery location of the order the delivery agent 114 is, or, when the delivery agent 114 is picking up orders from a retailer 110, how far from the location of the retailer 110 the delivery agent 114 is. The order manager 332, maintains a running record of orders collected by the delivery agent 114 for delivery. The order manager 332 may receive a list of orders assigned to the delivery agent 114 by the online concierge system 102 or may allow the delivery agent 114 to scan barcodes of orders he/she will deliver (e.g., when picking up orders from the retailer) or has delivered to customers 114. In one embodiment, the order manager 332 transmits information describing each order to the progress engine 3331, which updates its records of orders to be delivered by the delivery agent 114 accordingly.

The DMA 116 also includes a system communication interface 304 which interacts with the online concierge system 102. For example, the system communication interface 330 receives information from the online concierge system 102 about orders 108, retailers 110, user interfaces, and the like.

In some embodiments, the DMA 116 also includes a preferences management interface 336 which allows the delivery agent 114 to manage basic information associated with his/her account, such as his/her name, preferred delivery zone, status (actively taking deliveries, offline, etc.), and other personal information. The preferences management interface 336 may also allow the delivery agent 114 to review previous orders he/she delivered.

Figure 4A:
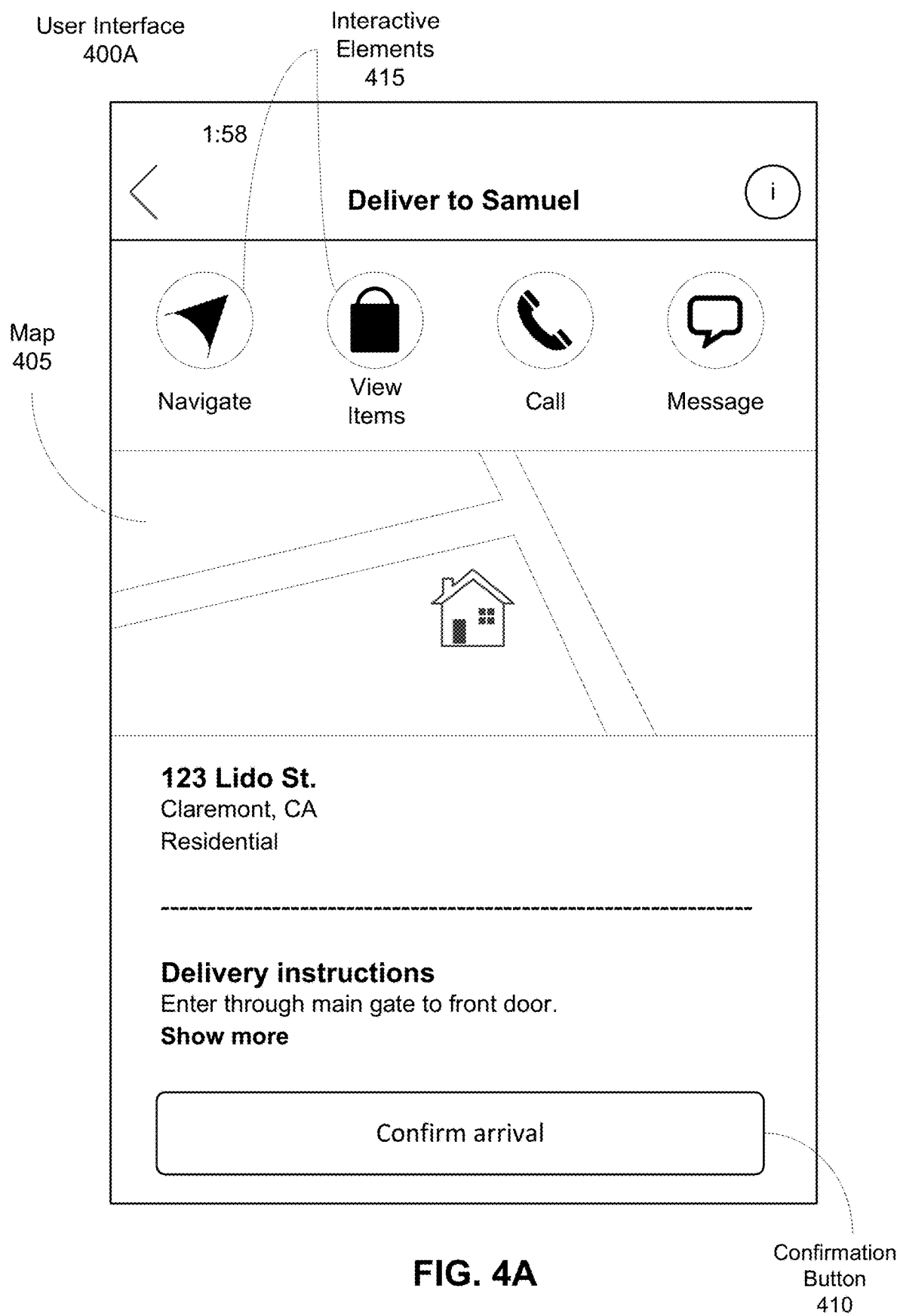
FIG. 4A is a user interface depicting a map to a delivery location of an order, according to one embodiment.

FIG. 4A is a user interface 400A depicting a map 405 to a delivery location of an order, according to one embodiment. The user interface 400A includes the map 405, which may update to show the real-time location of a client device of a delivery agent 114 as the delivery agent 114 moves closer to the delivery location, and a confirmation button 410, which the delivery agent 114 may interact with to send an indication to the online concierge system 102 that the delivery agent 114 has arrived at the delivery location. The user interface 400A may also include delivery information (e.g., address of the delivery location, delivery instructions, etc.) and a plurality of additional interactive elements that allow the delivery agent 114 to navigate to the delivery location, view items in the order, and call/message the customer 104 who placed the order.

Figure 4B:
FIG. 4B is a user interface depicting a signature notification, according to one embodiment.

When an order includes a high-value item (or otherwise requires verification of delivery), the DMA 116 may present a user interface 400B that displays a signature notification 420, as shown in FIG. 4B. The signature notification includes text indicating that the customer's signature is needed to complete delivery of the order. The signature notification 420 may be paired in the user interface 400B with a request button 425, which the delivery agent 114 may interact with to request the customer 104 sign for the order.

Figure 4C:
FIG. 4C is a user interface depicting issue buttons, according to one embodiment.
Figure 4D:
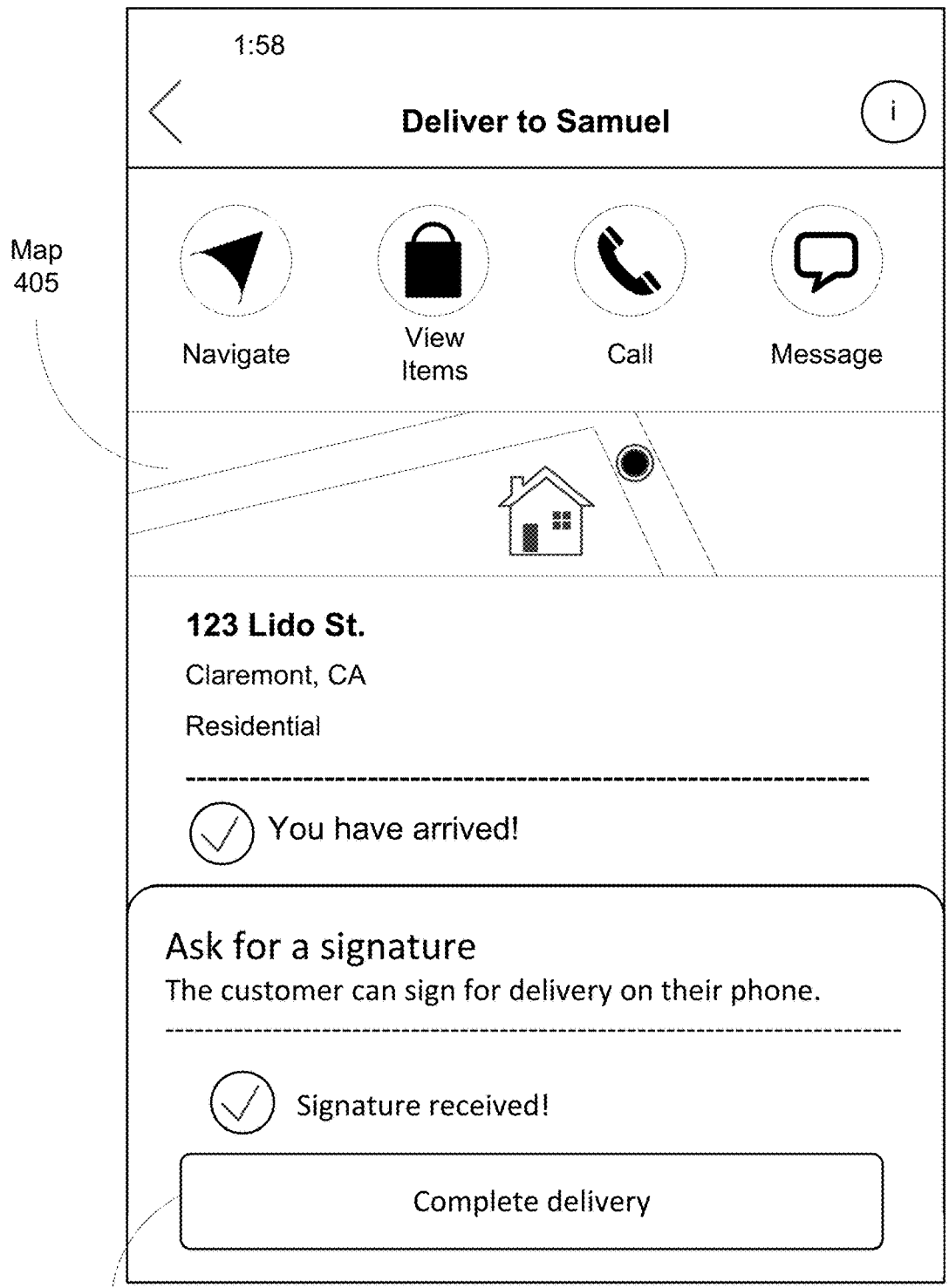
FIG. 4D is a user interface depicting a confirmation button, according to one embodiment.

The DMA 116 may update the user interface 400C, as shown in FIG. 4C, to display issue buttons 430 that the delivery agent 114 may interact with if the customer 104 is unable or unavailable to sign for the order. In some embodiments, the DMA 116 may display a user interface 400 with interactive elements that the delivery agent 114 may use to enter identification information about the customer 104 when the customer 104 is unable to sign for the order. This user interface 400 is further described in relation to FIGS. 5A-5C. In other embodiments, the DMA 116 may display a user interface 400C depicting instructions for the delivery agent 114 to return all or a subset of the order to a retailer 110. If the customer 104 did provide a signature via the CMA 106, the DMA 116 may display a user interface 400D including information indicating that the signature was received, as shown in FIG. 4D. The user interface 400D may also include a confirmation button 430 that the delivery agent 114 may interact with to indicate to the online concierge system 102 that the order has been delivered.

Figure 5A:
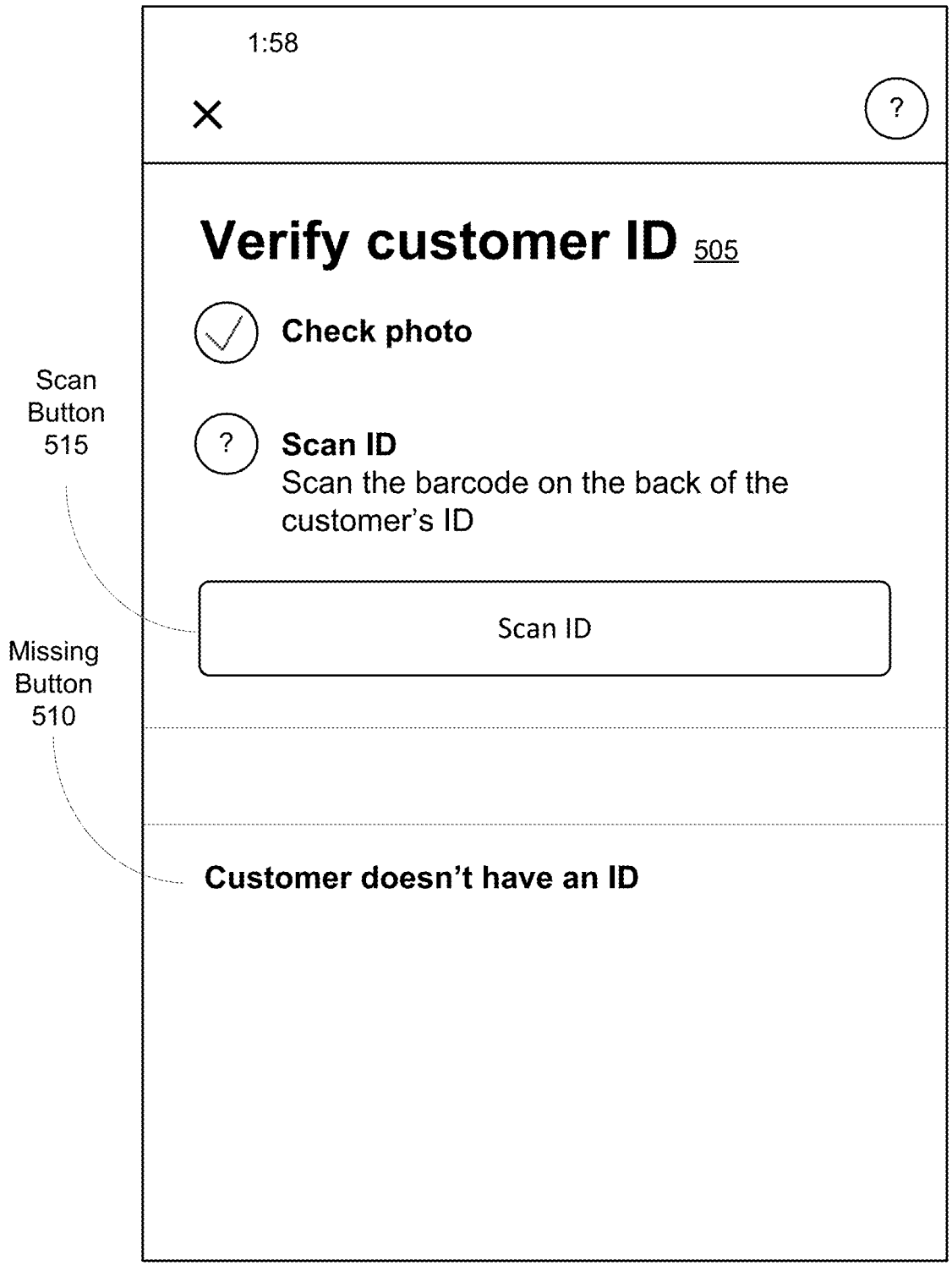
FIG. 5A is a user interface depicting a verification flow, according to one embodiment.

FIG. 5A is a user interface 500A depicting a verification flow 505, according to one embodiment. The verification flow 505 is a checklist for a delivery agent 114 to follow to receive identification information from a customer 104. This verification information may be used in place of the customer's signature for verification of delivery of an order when the customer 104 is unable to provide a signature. The verification flow 505 may include instructions describing how to check an identification document of a customer 104 and one or more interactive elements, such as a missing button 510 and a scan button 515. The delivery agent 114 may interact with the missing button 510 to indicate that the customer 104 does not have an identification document, and the DMA 116 may update the user interface 500A to display instructions indicating that the delivery agent 114 should return all or a subset of the order to a retailer 110.

Figure 5B:
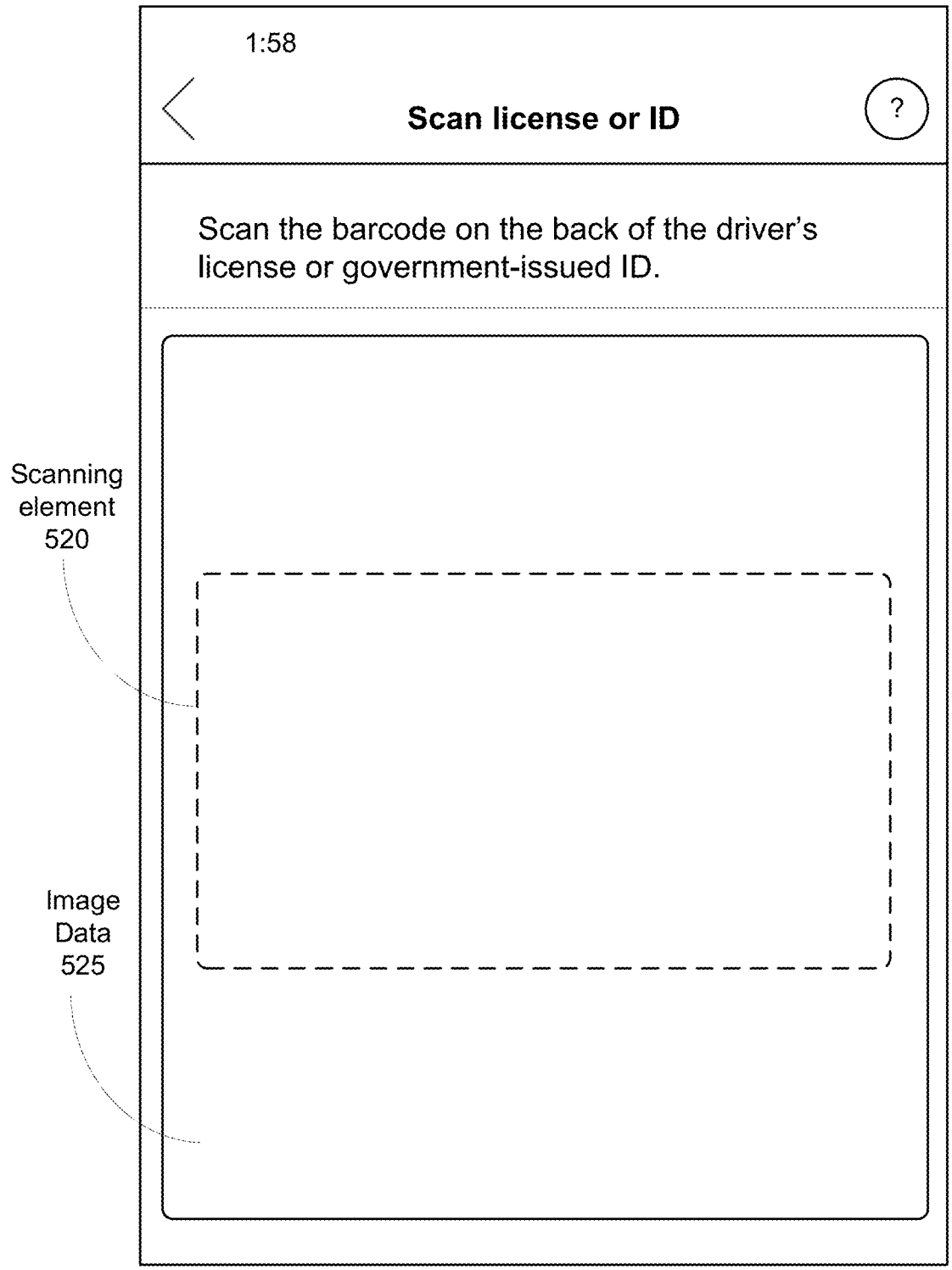
FIG. 5B is a user interface depicting a scanning element, according to one embodiment.

Upon receiving an interaction with the scan button 515, the DMA 114 may update the user interface 500B to display real-time image data 525 received from a camera of the delivery agent's client device and a scanning element 520, as shown in FIG. 5B. The scanning element 520 may be overlaid on the image data to indicate where the delivery agent 114 should position the customer's identification document for scanning. Alternatively, the DMA 116 may update the user interface 500C to display interactive text boxes 530 configured to receive identification information about the customer 104, as shown in FIG. 5C. The user interface 500C may also include a confirmation button 535 that the delivery agent 114 may interact with to indicate that the interactive text boxes 530 contain identification information for the customer 104.

Figure 6:
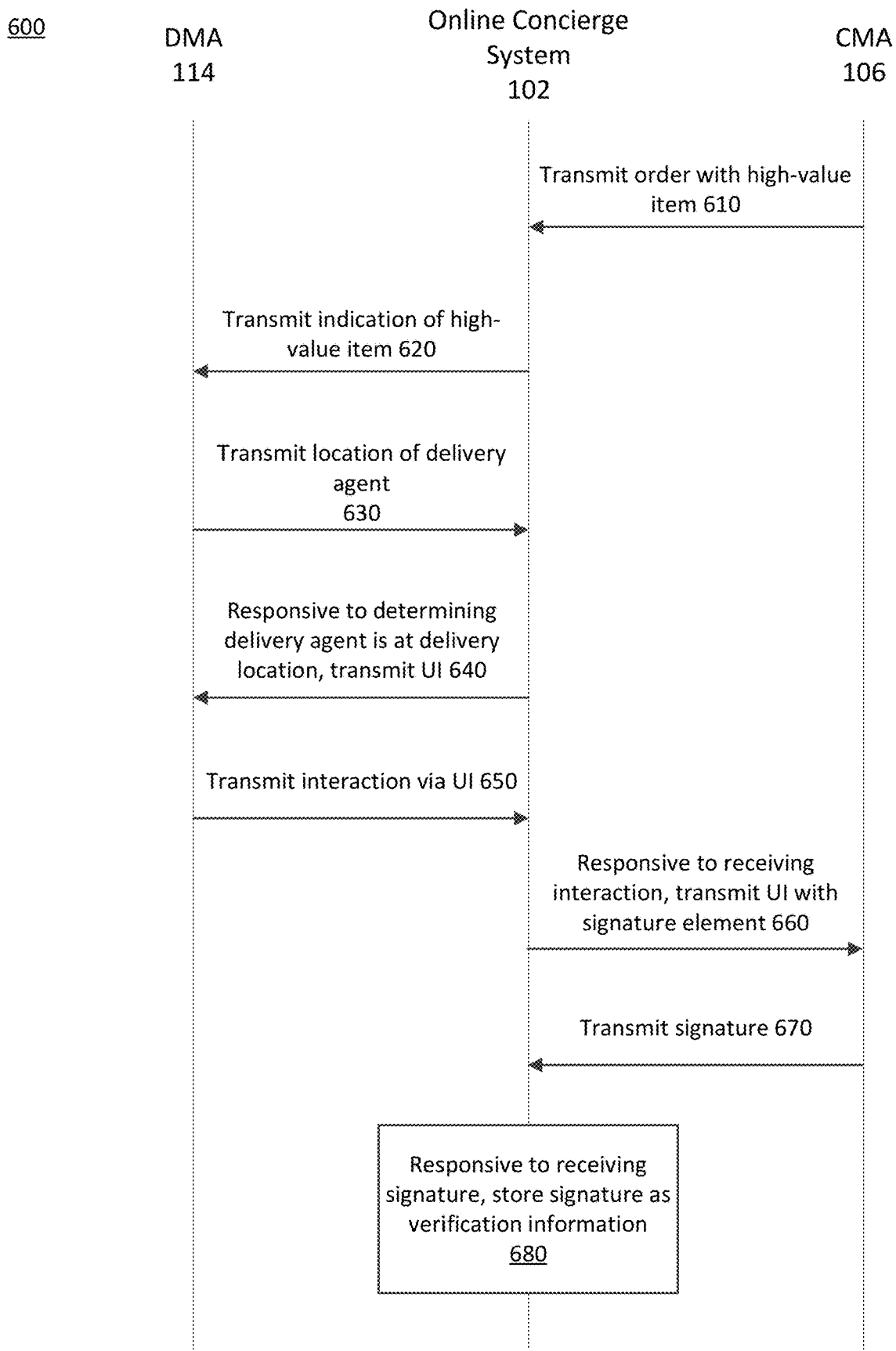
FIG. 6 is an interaction diagram illustrating interactions between a delivery mobile application, online concierge system, and customer mobile application, according to one embodiment.

FIG. 6 is an interaction diagram 600 illustrating interactions between the DMA 114, online concierge system 102, and CMA 106, according to one embodiment. In particular, the CMA 106 may receive an order including a high-value item and transmit 610 information describing the order to the online concierge system 102. The online concierge system 102 receives the order from the CMA 106 and determines that the order includes the high-value item. The online concierge system 102 transmits 620 an indication that the order includes the high-value item to the DMA 116. The DMA 116 transmits 630 a real-time location of a client device of the delivery agent 114 to the online concierge system 102. The online concierge system 102 may also receive indications from the DMA 116 indicating that the delivery agent is at a delivery location of the order. Responsive to determining that the delivery agent is at a delivery location, the online concierge system 102 transmits 640 an indication to the DMA 116 to display a user interface, such as the user interface depicted in FIGS. 4A-4D. The DMA 116 receives interactions from the delivery agent 114 via the user interface, and the DMA 116 may transmit 650 an interaction (or an indication of the interaction) to the online concierge system 102. Responsive to receiving the interaction (or indication), the online concierge system 102 may transmit 660 an indication to the CMA 106 to display a user interface with a signature element. The CMA 106 may transmit 670 a signature received via the signature element to the online concierge system 102. Responsive to receiving the signature, the online concierge system 102 may store the signature in the transaction records database 208 as verification information that the order was delivered.

It is appreciated that although FIG. 6 illustrates a number of interactions according to one embodiment, the precise interactions and/or order of interactions may vary in different embodiments. For example, in some embodiments, responsive to receiving an indication from the CMA 106 that the customer is unable to sign for the order, the online concierge system 102 may send a user interface to the DMA 116. The user interface may be configured to verify an identification document of the customer 104. In some embodiments, the user interface may be configured to receive identification information from an identification document of the customer 104 manually entered by the delivery agent 114 or an image of the identification document captured via the delivery agent's client device.

In some embodiments, responsive to receiving an indication of an issue with the identification document from the DMA 116, the online concierge system 102 may send instructions to return the order to the DMA 116. Responsive to receiving, from the DMA 116, and indication that the order was returned, the online concierge system 102 may send instructions to the DMA 116 describing how to receive reimbursement for the order, particularly in instances when the delivery agent 114 also fulfilled the order at a retailer 110. In other embodiments, responsive to receiving an indication that the customer is unable to sign for the order from the CMA 106, the online concierge system 102 may send instructions to the DMA 116 to return the high-value item to the retailer 110 and deliver the rest of the order to the customer 104.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    receiving, from a customer client device associated with a customer, an order of items, wherein the order includes a high-value item;
    sending, to a delivery client device associated with a delivery agent, an indication that the order includes the high-value item;
    determining that the delivery client device is within a geofence around a delivery location of the order;
    responsive to determining that the delivery client device is within the geofence around the delivery location of the order, transmitting, to the delivery client device, a first instruction, causing a first application installed on the delivery client device to display a first user interface, the first user interface including (1) a map showing the delivery location and a real time location of the delivery client device, indicating that the delivery agent has arrived at the delivery location, and (2) a first interactive element for requesting a signature from a customer;
    receiving, from the delivery client device, an interaction with the first interactive element;
    responsive to receiving, from the delivery client device, the interaction with the first interactive element, transmitting, to the customer client device, a second instruction, causing a second application installed on the customer client device to display a second user interface, the second user interface including a signature element, wherein the signature element is configured to receive a user input from the customer, the user input representing that the customer has signed for delivery of the high-value item;
    receiving, from the customer client device, the user input of the customer; and
    responsive to receiving the user input from the customer client device,
        storing the signature as verification information for the order in a verification database;
        transmitting, to the delivery client device, a third instruction, causing the first application installed on the delivery client device to display a third user interface, the third user interface including (1) a notification notifying the delivery agent that the customer has signed for the delivery of the high-value item, and (2) a second interactive element for confirming complete delivery of the high-value item; and
        responsive to receiving, from the delivery client device, an interaction with the second interactive element confirming the complete delivery, storing confirmation of the complete delivery in the verification database.

2. The computer-implemented method of claim 1, further comprising:
    responsive to receiving, via the customer client device, an indication that the customer cannot sign for the order, sending, to the delivery client device, a fourth user interface configured to verify an identification document of the customer.

3. The computer-implemented method of claim 2, wherein the fourth user interface is configured to receive manually-entered identification information from the identification document via the delivery client device.

4. The computer-implemented method of claim 2, wherein the fourth user interface is configured to receive an image of the identification document captured via the delivery client device.

5. The computer-implemented method of claim 2, further comprising:
    responsive to receiving, from the delivery client device, an indication of an issue with the identification document, sending, to the delivery client device, instructions to return the order to a retailer.

6. The computer-implemented method of claim 5, further comprising:
    responsive to receiving, from the delivery client device, an indication that the order was returned, sending, to the delivery client device, instructions for receiving a compensation for returning the order.

7. The computer-implemented method of claim 1, further comprising:
    responsive to receiving, from the customer client device, an indication that the customer cannot sign for the order, sending, to the delivery client device, instructions to return the high-value item to a retailer and deliver a remainder of the order to the customer.

8. A non-transitory computer-readable storage medium comprising instructions, when executed by a processor, cause the processor to perform actions comprising:
receiving, from a customer client device associated with a customer, an order of items, wherein the order includes a high-value item;
sending, to a delivery client device associated with a delivery agent, an indication that the order includes the high-value item;
determining that the delivery client device is within a geofence around delivery location of the order;
responsive to determining that the delivery client device is within the geofence around the delivery location of the order, transmitting, to the delivery client device, a first instruction, causing a first application installed on the delivery client device to display a first user interface, the first user interface including (1) a map showing the delivery location and a real time location of the delivery client device, indicating that the delivery agent has arrived at the delivery location, and (2) a first interactive element for requesting a signature from a customer;
responsive to receiving, from the delivery client device, an interaction with the first interactive element, transmitting, to the customer client device, a second instruction, causing a second application installed on the customer client device to display a second user interface, the second user interface including a signature element, wherein the signature element is configured to receive a user input from the customer, the user input representing that the customer has signed for delivery of the high-value item;
receiving, from the customer client device, the user input of the customer; and
responsive to receiving the user input from the customer client device,
storing the signature as verification information for the order in a verification database;
transmitting, to the delivery client device, a third instruction, causing the first application installed on the delivery client device to display a third user interface, the third user interface including (1) a notification notifying the delivery agent that the customer has signed for the delivery of the high-value item, and (2) a second interactive element for confirming complete delivery of the high-value item; and
responsive to receiving, from the delivery client device, an interaction with the second interactive element confirming the complete delivery, storing confirmation of the complete delivery in the verification database.

9. The non-transitory computer-readable storage medium of claim 8, the instructions further comprising:
responsive to receiving, via the customer client device, an indication that the customer cannot sign for the order, instructions for sending, to the delivery client device, a fourth user interface configured to verify an identification document of the customer.

10. The non-transitory computer-readable storage medium of claim 9, wherein the fourth user interface is configured to receive manually-entered identification information from the identification document via the delivery client device.

11. The non-transitory computer-readable storage medium of claim 9, wherein the fourth user interface is configured to receive an image of the identification document captured via the delivery client device.

12. The non-transitory computer-readable storage medium of claim 9, the instructions further comprising:
responsive to receiving, from the delivery client device, an indication of an issue with the identification document, instructions for sending, to the delivery client device, instructions to return the order to a retailer.

13. The non-transitory computer-readable storage medium of claim 12, the instructions further comprising:
responsive to receiving, from the delivery client device, an indication that the order was returned, instructions for sending, to the delivery client device, instructions for receiving compensation for returning the order.

14. The non-transitory computer-readable storage medium of claim 8, the instructions further comprising:
responsive to receiving, from the customer client device, an indication that the customer cannot sign for the order, instructions for sending, to the delivery client device, instructions to return the high-value item to a retailer and deliver a remainder of the order to the customer.

15. A computer system comprising:
a computer processor; and
a non-transitory computer-readable storage medium storing instructions that when executed by the computer processor perform actions comprising:
receiving, from a customer client device associated with a customer, an order of items, wherein the order includes a high-value item;
sending, to a delivery client device associated with a delivery agent, an indication that the order includes the high-value item;
determining that the delivery client device is within a geofence around a delivery location of the order;
responsive to determining that the delivery client device is within the geofence around the delivery location of the order, transmitting, to the delivery client device, a first instruction, causing a first application installed on the delivery client device to display a first user interface, the first user interface including (1) a map showing the delivery location and a real time location of the delivery client device, indicating that the delivery agent has arrived at the delivery location, and (2) a first interactive element for requesting a signature from a customer;
receiving, from the delivery client device, an interaction with the first interactive element;
responsive to receiving, from the delivery client device, the interaction with the first interactive element, transmitting, to the customer client device, a second instruction, causing a second application installed on the customer client device to display a second user interface, the second user interface including a signature element, wherein the signature element is configured to receive a user input from the customer, the user input representing that the customer has signed for delivery of the high-value item;
receiving, from the customer client device, the user input of the customer; and
responsive to receiving the user input from the customer client device,
storing the signature as verification information for the order in a verification database;

transmitting, to the delivery client device, a third instruction, causing the first application installed on the delivery client device to display a third user interface, the third user interface including (1) a notification notifying the delivery agent that the customer has signed for the delivery of the high-value item, and (2) a second interactive element for confirming complete delivery of the high-value item; and responsive to receiving, from the delivery client device, the interaction with the second interactive element confirming the complete delivery, storing confirmation of the complete delivery in the verification database.

16. The computer system of claim 15, the actions further comprising:

responsive to receiving, via the customer client device, an indication that the customer cannot sign for the order, sending, to the delivery client device, a fourth user interface configured to verify an identification document of the customer.

17. The computer system of claim 16, wherein the fourth user interface is configured to receive manually-entered identification information from the identification document via the delivery client device.

18. The computer system of claim 16, wherein the fourth user interface is configured to receive an image of the identification document captured via the delivery client device.

19. The computer system of claim 16, the actions further comprising:

responsive to receiving, from the delivery client device, an indication of an issue with the identification document, sending, to the delivery client device, instructions to return the order to a retailer.

20. The computer system of claim 19, the actions further comprising:

responsive to receiving, from the delivery client device, an indication that the order was returned, sending, to the delivery client device, instructions for receiving a reimbursement of the order.

* * * * *